United States Patent [19]
Shen

[11] Patent Number: 5,772,164
[45] Date of Patent: Jun. 30, 1998

[54] ANGULARLY POSITIONABLE CAMERA TRIPOD

[76] Inventor: Wei-Hong Shen, 6F, No. 416, Sec. 4, Jen-AI Road, Taipei, Taiwan

[21] Appl. No.: 715,843

[22] Filed: Sep. 25, 1996

[51] Int. Cl.[6] .................................................. F16M 11/38
[52] U.S. Cl. .......................................... 248/170; 248/168
[58] Field of Search ................................... 248/166, 168, 248/181.11, 181.2, 188.6, 170

[56] References Cited

U.S. PATENT DOCUMENTS

| | | | |
|---|---|---|---|
| 3,921,947 | 11/1975 | Adam | 248/168 X |
| 4,309,010 | 1/1982 | Posso | 248/166 X |
| 4,317,552 | 3/1982 | Weidler | 248/168 |
| 4,453,686 | 6/1984 | Ina | 248/168 |
| 4,767,090 | 8/1988 | Hartman et al. | 248/168 |
| 4,832,296 | 5/1989 | Schnepp | 248/168 |
| 5,390,885 | 2/1995 | Shen | 248/168 |
| 5,505,415 | 4/1996 | Brett | 248/168 |
| 5,513,784 | 5/1996 | Pretorius | 248/181.1 X |

*Primary Examiner*—Peter M. Cuomo
*Assistant Examiner*—Stephen Vu
*Attorney, Agent, or Firm*—Morton J. Rosenberg; David I. Klein; Jun Y. Lee

[57] ABSTRACT

A tripod including a tripod head supported on tripod legs and formed of two symmetrical half shells and defining a ball socket between the half shells, a camera platform adapted for holding a camera and having a ball at the bottom mounted in the ball socket of the tripod head, a hexagon nut mounted within a hexagonal hole in one half shell of the tripod head, a lock screw inserted through a respective mounting hole in each half shell of the tripod head and threaded into the hexagon nut and then screwed up with a cap nut, wherein turning the lock screw in one direction causes the two half shells of the tripod head to be released from each other for permitting the ball of the camera platform to be turned to the desired angle; turning the lock screw in the reversed direction causes the ball of the camera platform to be firmly retained in the ball socket of the tripod head in position.

1 Claim, 6 Drawing Sheets

ANGULARLY POSITIONABLE CAMERA TRIPOD

BACKGROUND OF THE INVENTION

The present invention relates to tripods, and relates more particularly to such a tripod in which the camera platform can be turned in the tripod head and adjusted to the desired angle.

There is known a mini tripod adapted for supporting a camera on for example a table top. This structure of tripod as shown in FIG. 1, is comprised of a tripod head 10a supported on three tripod legs 30a, a camera platform 20a mounted on the tripod head 10a. The camera platform 20a has a bottom coupling block 21a pivotably coupled to a coupling hole 11a in the tripod head 10a, and locked by a lock (not shown). Because the camera platform 20a is pivoted to the tripod head 10a, its angle of inclination can only be adjusted in one direction, i.e., the angular position of the camera platform 20a can only be adjusted in X-axis direction but cannot be adjusted in Y-axis direction.

SUMMARY OF THE INVENTION

The present invention has been accomplished to provide a tripod which permits the angular position of the camera platform to be adjusted in X-axis direction as well as in Y-axis vertically. According to the preferred embodiment of the present invention, the tripod head is formed of two symmetrical half shells and defining a ball socket between the half shells; the camera platform has a ball at the bottom mounted in the ball socket of the tripod head; the lock for locking the camera platform is comprised of a hexagon nut mounted within a hexagonal hole in one half shell of the tripod head, a lock screw inserted through a respective mounting hole in each half shell of the tripod head and threaded into the hexagon nut, and a cap nut threaded onto the lock screw to hold down the hexagon nut in the hexagonal hole. When the lock screw is turned in one direction, the two half shells of the tripod head are released from each other for permitting the ball of the camera platform to be turned to the desired angle; when the lock screw is turned in the reversed direction, the ball of the camera platform is firmly retained in the ball socket of the tripod head in position.

DETAILED DESCRIPTION OF THE PREFERRED EMBODIMENT

Figure 1:
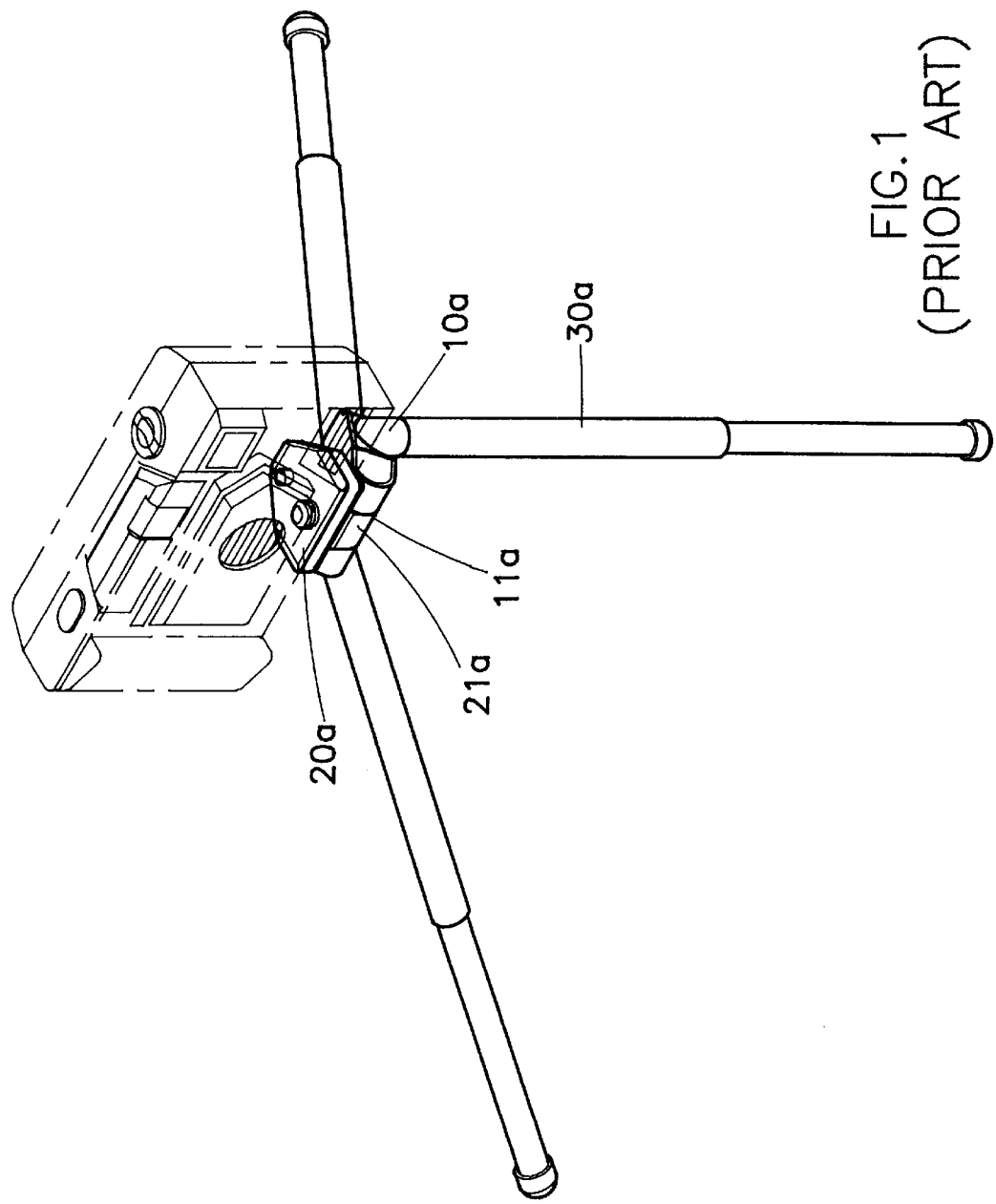
FIG. 1 is a perspective view of a tripod according to the prior art.
Figure 2:
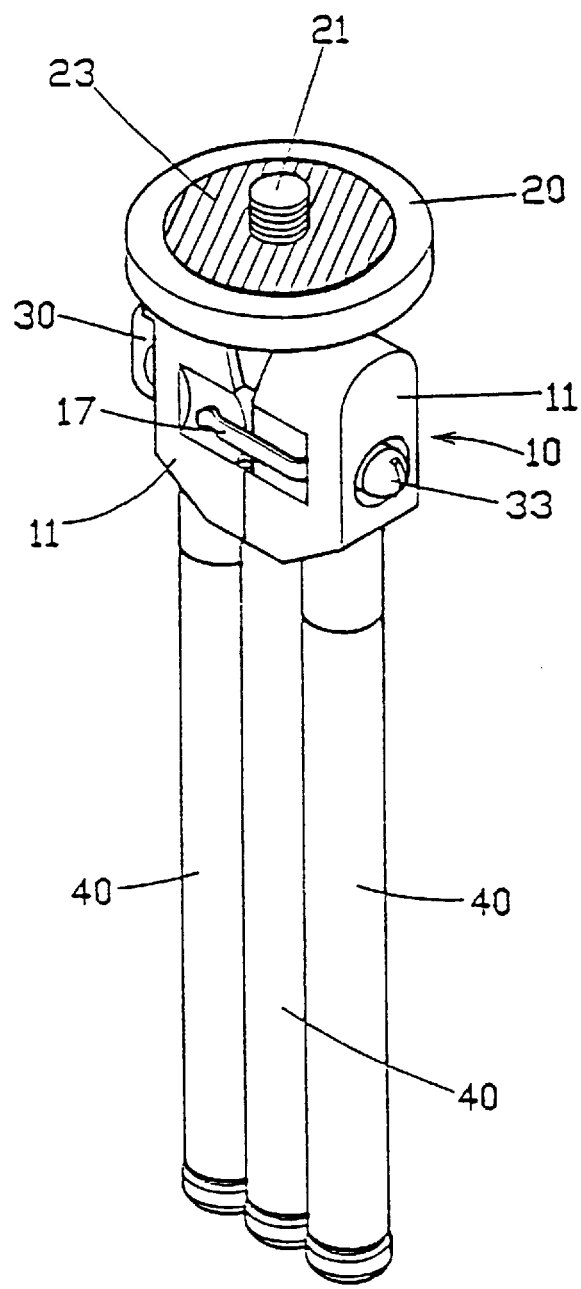
FIG. 2 is an elevational view of a tripod according to the present invention.
Figure 3:
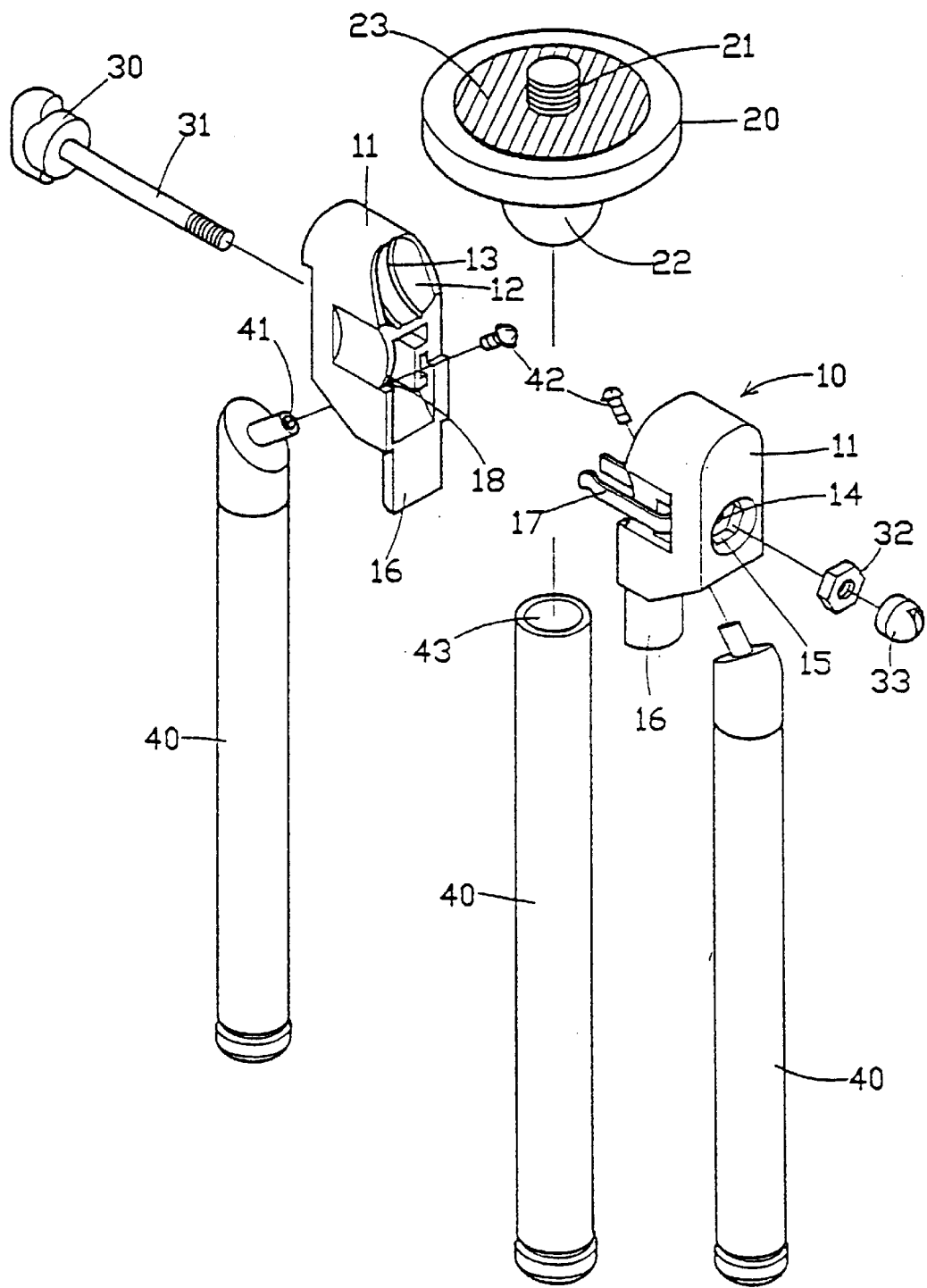
FIG. 3 is an exploded view of the tripod shown in FIG. 2.
Figure 4:
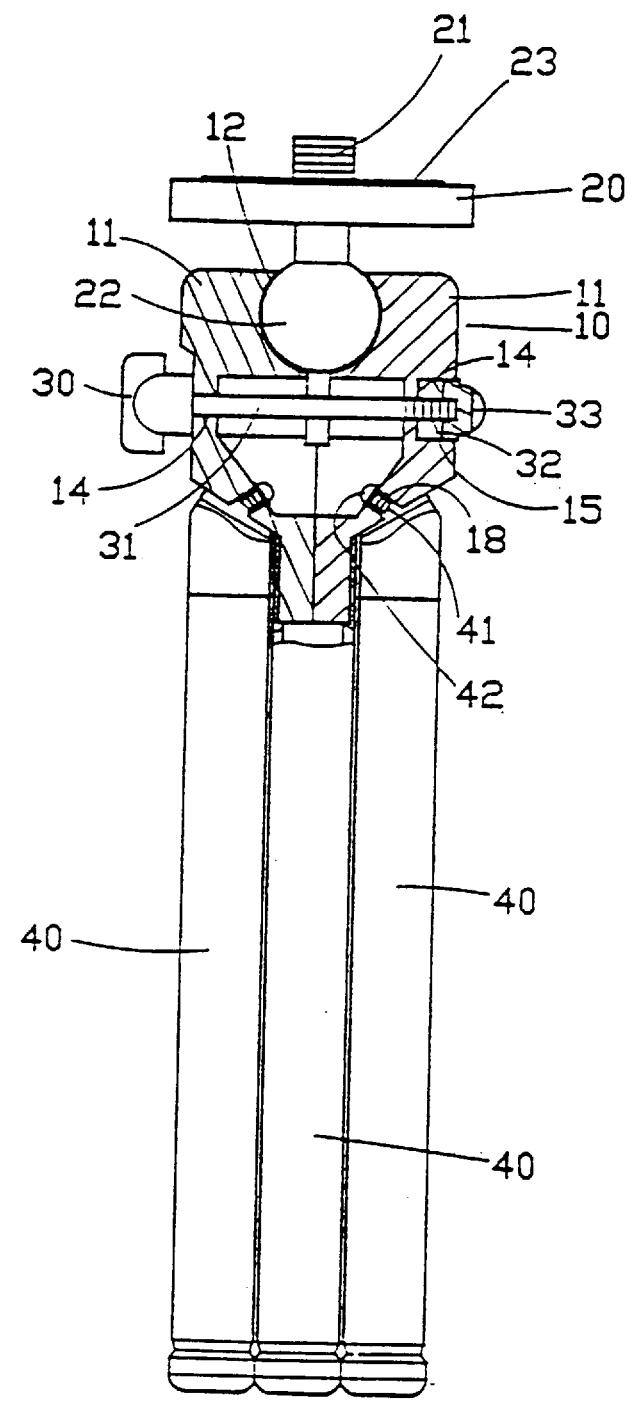
FIG. 4 is a sectional plain view of the tripod shown in FIG. 2.

Referring to FIGS. 2, 3, and 4, a tripod in accordance with the present invention is generally comprised of a tripod head 10, a camera platform 20, a lock screw 30, and three tripod legs 40. The tripod head 10 is comprised of two symmetrical half shells 11 connected together. The half shells 11 have a respective recessed hole 12 matched together. When the half shells 11 are abutted against each other, the recessed holes 12 of the half shells 11 form a ball socket for holding a ball. Grooves 13 are formed inside the recessed holes 12 of the half shells 11 to diminish material consumption. Each half shell 11 further comprises a transverse mounting hole 14, a bottom coupling hole 18 and a vertical semi-cylindrical downward rod 16 at the bottom. When the two half shells 11 are connected together, the semi-cylindrical downward rods 16 are matched together and form a cylindrical coupling rod. One half shell 11 further comprises a hexagonal hole 15 at the outer end of the respective transverse mounting hole 14, and a clip 17 adapted for fastening to the camera strap. The camera platform 20 comprises an upright screw rod 21 raised from the center of the flat top side thereof, a rubber pad 23 covered on the flat top side around the upright screw rod 21, and a coupling ball 22 raised from the bottom side thereof and adapted for mounting in the ball socket (namely, the recessed holes 12 of the two half shells 11). The screw body 31 of the lock screw 30 is inserted through the mounting holes 14 of the two half shells 11, and then screwed up with a hexagon nut 32 and a cap nut 33. The hexagon nut 32 is mounted within the hexagonal hole 15 of the half shell 11 of the tripod head 10, and threaded onto the screw body 31 of the lock screw 30. The cap nut 33 is threaded onto the screw body 31 of the lock screw 30 to hold down the hexagon nut 32 in the hexagonal hole 15. When the lock screw 30 is turned inwards, the two half shells 11 are closely attached together, and the ball 22 of the camera platform 20 is firmly retained in the ball socket (the recessed holes 12 of the two half shells 11), and cannot be turned relative to the tripod head 10. On the contrary, when the lock screw 30 is turned outwards, the two half shells 11 are released from each other, permitting the ball 22 of the camera platform 20 to be turned in the ball socket (the recessed holes 12 of the two half shells 11). One tripod leg has a coupling hole 43 at the top adapted for receiving the abutted downward rods 16 of the two half shells 11 of the tripod head 10. The other two tripod legs have a respective internally threaded coupling rod 41 at the top respectively fastened to the bottom coupling holes 18 of the two half shells 11 of the tripod head 10 by a respective screw 42.

Figure 5:
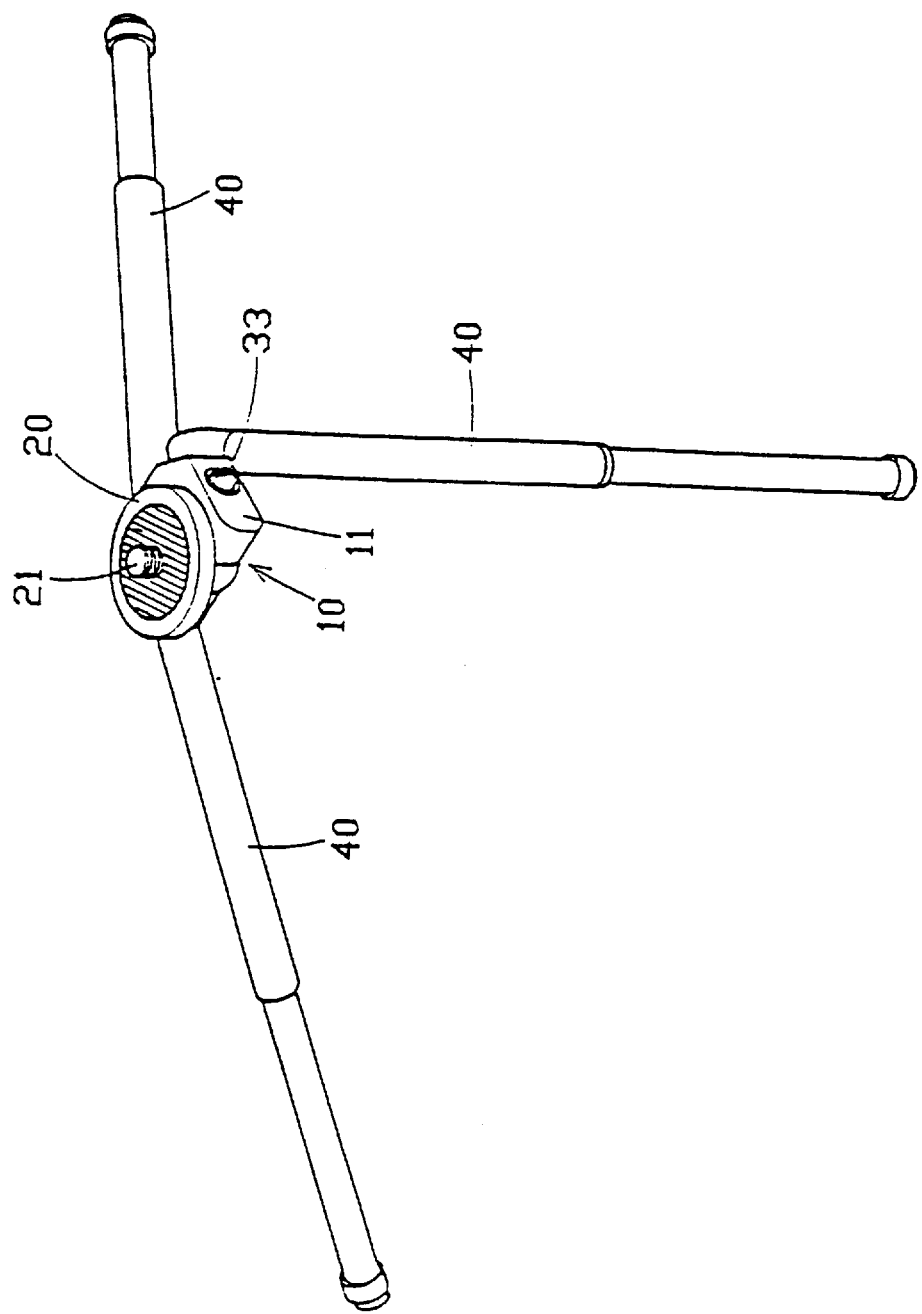
FIG. 5 is an applied view of the present invention, showing the angles of the adjusted; and, FIG. 6 is another applied view of the present invention, showing a camera carried on the camera platform.
Figure 6:
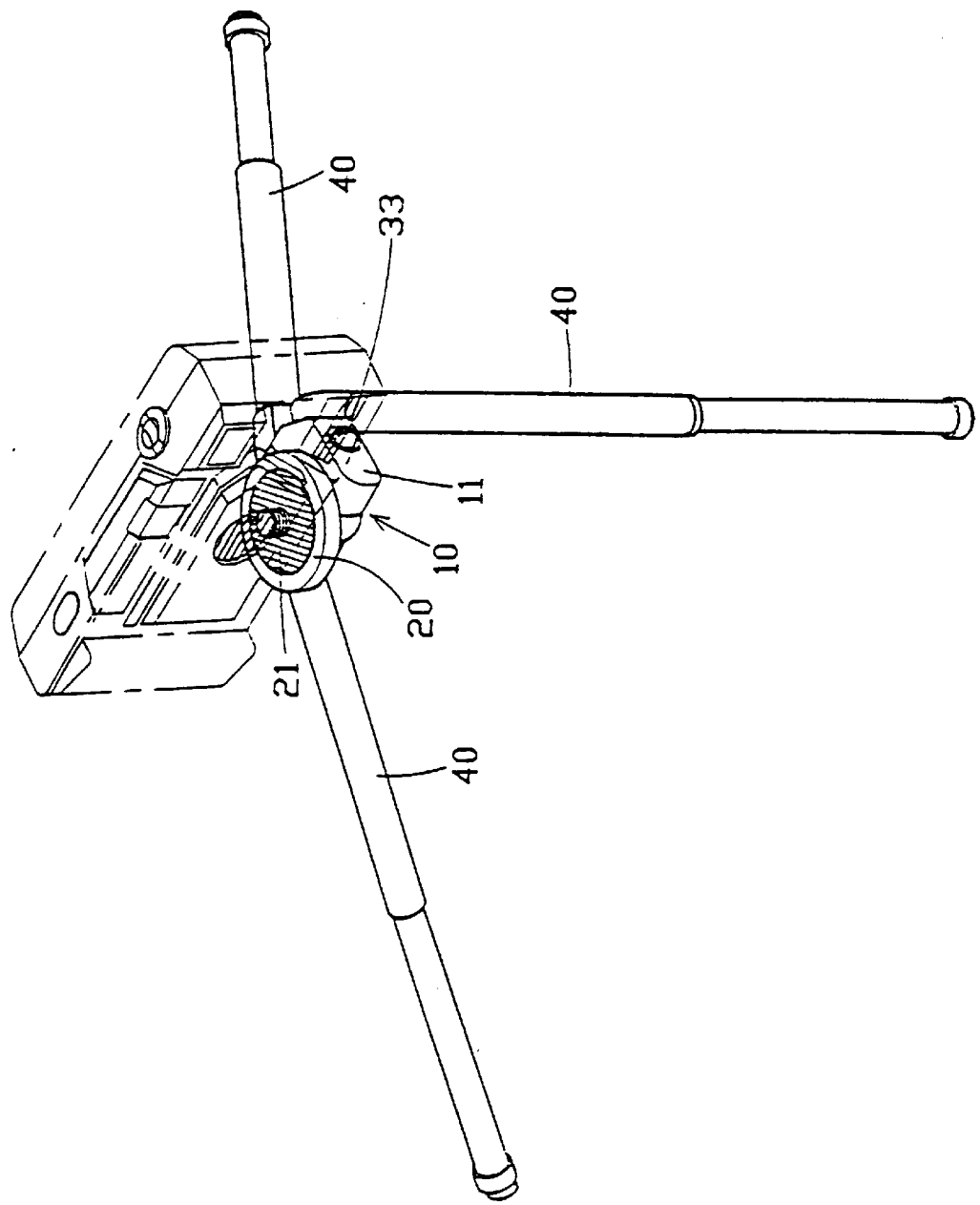

Referring to FIGS. 5 and 6, when assembled, the tripod head 10 and the camera platform 20 are supported on the tripod legs 40; when a camera is mounted on the camera platform 20 and fastened to the upright screw rod 21, the lock screw 30 can be loosened for permitting the platform 20 with the camera to be adjusted to the desired angle. When adjusted, the lock screw 30 is screwed tight again.

While only one embodiment of the present invention has been shown and described, it will be understood that various modifications and changes could be made thereunto without departing from the spirit and scope of the invention disclosed.

What the invention claimed is:

1. A tripod for supporting a camera, comprising:
   a camera platform having an upper surface with an upright screw rod extending from a central portion thereof for coupling with a camera, said camera platform having a coupling ball extending from a lower surface thereof;
   a tripod head formed by a first half shell and a second half shell coupled together and clampingly engaging said coupling ball of said camera platform therebetween, each of said first and second half shells having a recessed opening formed therein for receiving a respective portion of said coupling ball therein and a transverse mounting hole extending therethrough, each of said first and second half shells having a semi-cylindrical rod-shaped portion extending downwardly from a bottom portion thereof and a coupling hole extending through said bottom portion, said second half shell having a hexagonally-shaped opening formed coaxially with said transverse mounting hole;

a lock screw having a screw body with threads formed thereon and passing through said transverse mounting hole of each of said first and second half shells, said lock screw being threadedly engaged with a hexagonal nut disposed in said hexagonally-shaped opening for reversibly clamping said first and second half shells together to releasably lock said camera platform in a selected position;

a cap nut threadedly engaged with a distal end of said screw body for maintaining said hexagonal nut within said hexagonally-shaped opening;

a clip coupled to said first half shell through an opening formed therein for fastening said tripod to a strap of the camera;

a first tripod leg having a hole formed in an upper end thereof for receiving said semi-cylindrical rod-shaped portions of both said first and second half shells therein; and, a pair of second tripod legs respectively coupled to said first and second half shells, each of said pair of second tripod legs having an internally threaded coupling rod extending from an upper end thereof and passing through said coupling hole of a respective one of said first and second half shells and secured therein by a screw.

* * * * *